J. S. HOLLIDAY.
RAILWAY TRAFFIC CONTROLLING APPARATUS.
APPLICATION FILED APR. 23, 1914.

1,147,169.

Patented July 20, 1915.
2 SHEETS—SHEET 1.

J. S. HOLLIDAY.
RAILWAY TRAFFIC CONTROLLING APPARATUS.
APPLICATION FILED APR. 23, 1914.

1,147,169.

Patented July 20, 1915.
2 SHEETS—SHEET 2.

WITNESSES

INVENTOR
John S. Holliday
By Geo. E. Kruse
his atty.

UNITED STATES PATENT OFFICE.

JOHN S. HOLLIDAY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

1,147,169.     Specification of Letters Patent.     Patented July 20, 1915.

Continuation of application Serial No. 681,956, filed March 6, 1912. This application filed April 23, 1914. Serial No. 833,892.

*To all whom it may concern:*

Be it known that I, JOHN S. HOLLIDAY, a citizen of the United States, residing at Wilkinsburg, in the county of Allegheny and State of Pennsylvania, have invented certain new and useful Improvements in Railway-Traffic-Controlling Apparatus, of which the following is a specification.

My invention relates to the class of apparatus in which electric motors are employed for operating railway traffic controlling devices, and particularly to apparatus of this class in which alternating current motors are used.

The present application is a continuation of my co-pending application filed March 6, 1912, Serial No. 681,956, so far as the subject-matter common to the two is concerned.

I will describe two forms of apparatus and circuits embodying my invention, and then point out the novel features thereof in claims.

Figure 1:
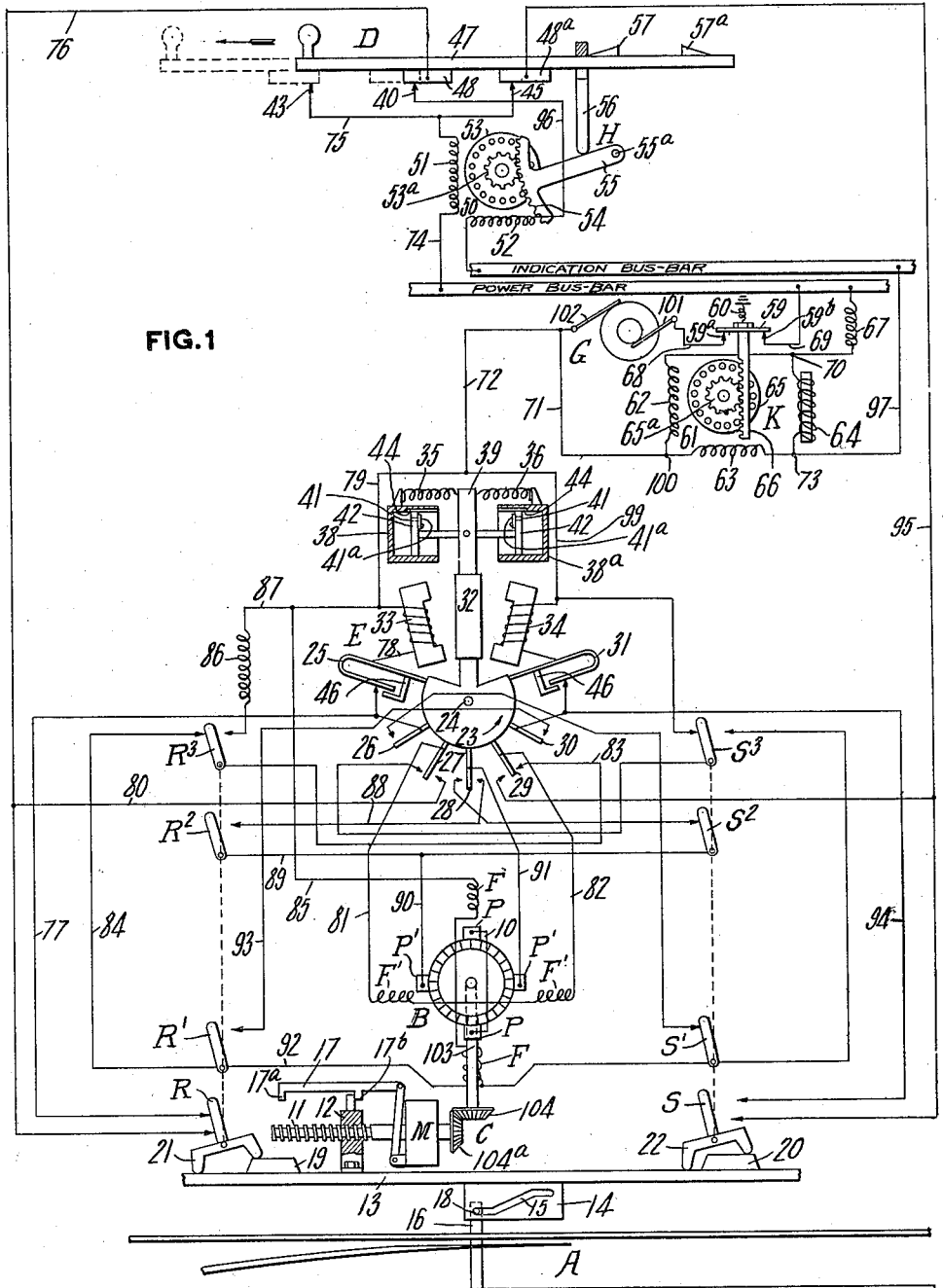
Figure 2:
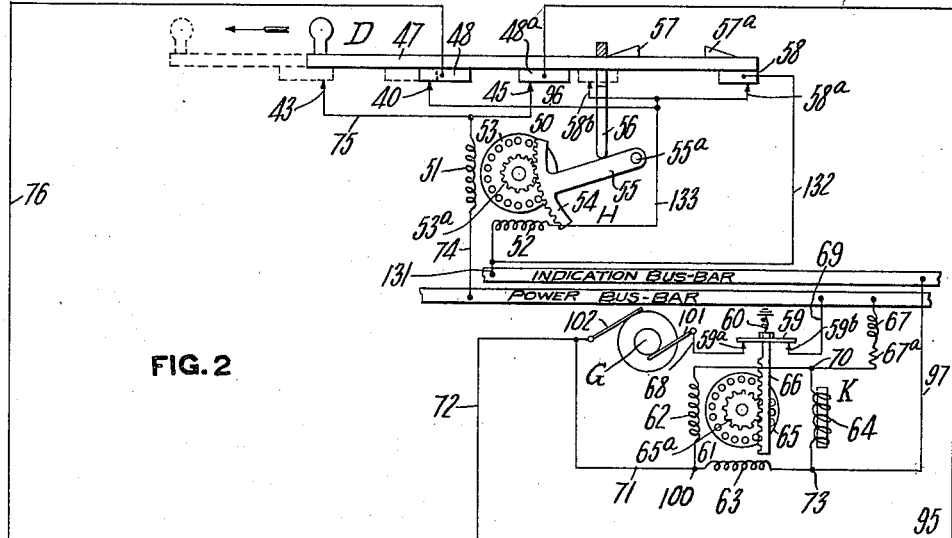
Figure 2:
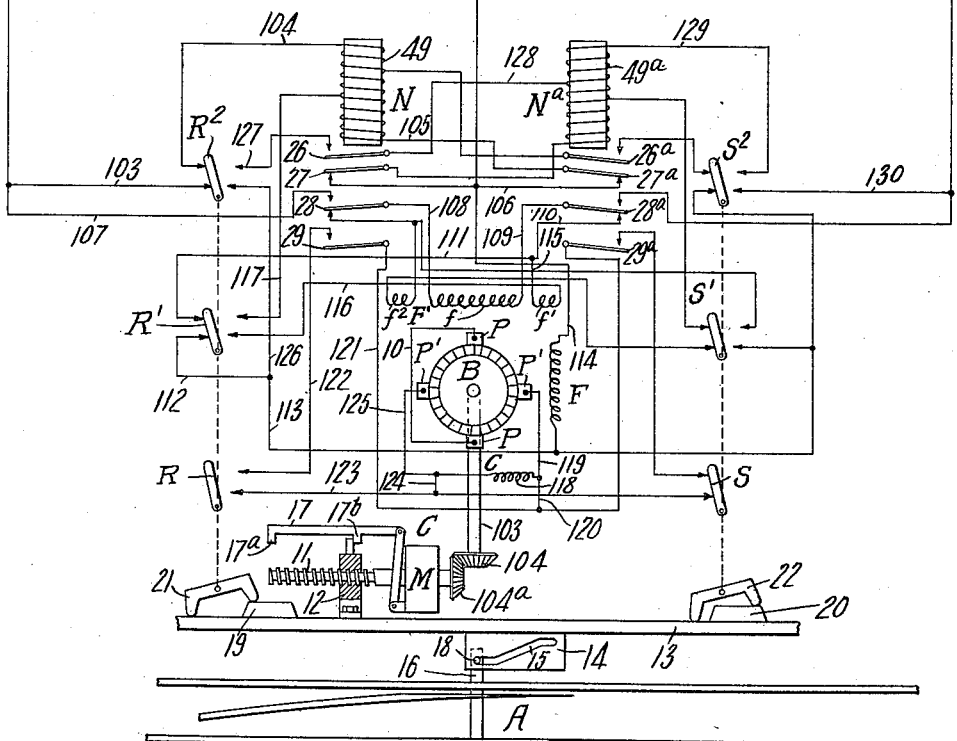

In the accompanying drawings, Figure 1 is a diagrammatic view showing one form and arrangement of apparatus and circuits embodying my invention, and Fig. 2 is a view showing a modification thereof.

One feature of a system embodying my invention is the use of a repulsion motor for operating a railway traffic controlling device, and a source of single phase current for operating the motor. I provide two field windings for the motor, both of which are connected with the source of current while the motor is operating the traffic controlling device, and one of which is disconnected from the source when the movement and locking of the device have been accomplished and is connected with an indication device to control the latter by the current generated in this winding while the motor then operates on current supplied to its other winding from the source.

Referring first to Fig. 1, A designates a railway traffic controlling device, here shown as being a railway switch, which switch is operated by an electric motor B through the medium of a suitable operating mechanism C. This motor is supplied with operating current from a suitable source such as a single-phase generator G, the application of current from this generator to the motor being directly controlled by a circuit controller E, which latter is in turn governed by a manually operated controlling lever D, usually one of a plurality of similar levers in an "interlocking machine." The movements of this lever D are controlled by an indication device H, which device is controlled by current generated at times by motor B, as hereinafter explained.

K is a circuit breaker arranged to permit the operation of the motor B by current which reaches it through the proper channels from the generator G, but to prevent the false operation of the motor in case of crossed wires.

The motor B as here shown is a repulsion motor, comprising two field windings F and F', and two pairs of brushes P, P and P', P'. Each winding F and F' is here shown in two sections for convenience, but it is understood that in practice each one would be a continuous winding. The brushes P, P are permanently short-circuited by a conductor 10, and the other pair are short-circuited at times as hereinafter explained. The two windings F and F' are located substantially 90 electrical degrees apart and the two pairs of brushes are also located substantially 90 electrical degrees apart, the pair P, P being located at an angle to the resultant magnetic field produced by the two windings F and F'.

The rotating member of motor B is operatively connected with a screw 11 through the medium of a shaft 103, bevel gears 104, 104ª, and a clutch device M, which latter, as here shown, is mechanically controlled, and may be of a type such as is shown in United States Letters Patent No. 870,912 granted to John D. Taylor on November 12, 1907. The screw 11 coacts with a threaded block 12 fixed to a bar 13, so that this bar may be reciprocated by reverse operations of the motor when the clutch M is operative. The clutch device M is controlled by means of a link 17 having two fingers 17ª and 17ᵇ, one or the other of which is engaged by the block 12 when the bar 13 has reached one extremity of its stroke or the other, thereby disconnecting clutch M. Secured to the bar 13 is a cam plate 14 having a cam slot 15 which operates a stud or roller 18, and this stud or roller actuates a rod 16 which is connected with the movable rails of switch A. It will be seen, therefore, that reciprocation of bar 13 will cause reverse movements of switch A. The bar 13 is provided with cams 19 and 20 which operate two pivotally mounted rocking arms 21 and 22; the arm 21 actuates contacts R, R', R², and R³, and the arm 22 actuates contacts S, S', S², and S³. It is understood that the operating mechanism C, which I have just described, is merely illustrative and that any suitable form of mechanism may be employed in lieu thereof.

The circuit controller E comprises a contact operating member 23 pivotally mounted to oscillate at the point 24. This member is controlled by an armature 32 which is rocked in one direction or the other from its middle position by means of electromagnets 33 and 34. The member 23 and its armature are held normally in their middle position by means of two spiral springs 35 and 36 which are connected to a tongue 39 fixed to the armature.

The contact operating member 23 carries seven contact fingers, 25 to 31 inclusive. The operation of contacts 26, 27, 28, 29 and 30 is evident from the drawing and requires no explanation. Contacts 25 and 31 are so constructed that when the member 23 is in its middle position they are both closed; that when the member 23 rocks in the direction of the arrow, contact 31 opens and contact 25 remains closed; and that when the member 23 rocks in the other direction contact 25 opens and 31 remains closed. Each of these fingers is preferably bent back on itself as shown so as to provide the necessary elasticity, and its movement outwardly toward its coöperating contact point is limited by a stop 46.

With the arrangement of circuits here shown, it is desirable that when the member 23 has been rocked to either of its extreme positions by one or the other of the magnets 33 or 34, its return movement should be retarded so that the contacts which are then closed shall remain closed for a short interval of time after the actuating magnet has become deënergized. To accomplish this I provide two air dash pots 38, 38ª, the pistons 42 of which are operatively connected with the tongue 39. Each piston is provided with a port 41 and with a flap 41ª which covers the port and which opens outwardly only, so that movement of the piston toward the bottom of the pot is not resisted, but that movement of the piston outwardly from the bottom of the pot is resisted by atmospheric pressure and is permitted only by the leakage of air around the piston and around the flap of the port. In order to avoid resistance to the movement of either piston outwardly from its middle position I provide in the wall of each cylinder a slot 44 which opens the dash pot to atmosphere as soon as the piston moves outwardly from the middle position. It will be seen from the foregoing explanation that when the armature 32 and contact operating member 23 are moved in either direction by one of the magnets, the movement is not resisted by the dash pots, but that when the magnet is deënergized the return movement toward the middle position under the influence of spring 35 or 36 is retarded by one or the other of the dash pots.

It is understood that the form of circuit controlling device E which I have herein shown and described is merely illustrative and that any other desired form of device which will accomplish a similar control of the circuits may be substituted therefor.

The manually operable lever D here shown comprises a longitudinally movable bar 47 which carries two contact blocks 48 and 48ª which coöperate with contacts 43, 40 and 45. Usually this lever will be one of a number of similar levers comprised in an interlocking machine, and it is understood that this lever may operate suitable means for locking and unlocking other levers of the same machine; such means are well understood in the art and have no bearing on the present invention, hence all illustration and description thereof are omitted.

The indication device H, which controls the movements of lever D, comprises an induction motor 50 having two stator windings 51 and 52 and a rotor 53. The rotor 53 operates a pinion 53ª which meshes with a curved rack 54 carried by an arm 55 pivoted at 55ª. When motor 50 is energized, the arm 55 raises a latch 56 out of the path of dogs 57 and 57ª carried by lever 47, thereby permitting the stroke of the lever to be completed.

It is understood that the form of manually operated lever and the form of indication device which I have shown and described are merely illustrative. Several different forms of these devices are known in the art, any of which may be employed in lieu of those which I have shown.

Extending from the control lever D to the circuit controlling device E and switch motor B are three wires 76, 95 and 72; the circuit for an operation of the switch A in one direction includes wires 76 and 72, and the circuit for an operation of the switch in the other direction includes wires 95 and 72. Hence, I will hereinafter term wires 76 and 95 the "control wires" and wire 72 the "common return wire."

The circuit breaker K comprises two contacts 59ª and 59ᵇ, and a bridging member 59. The member 59 is biased to the open position by a spring 60 but is held closed against the action of the spring by a motor 61 when the motor is properly energized. This motor is of the induction type comprising two stator windings 62 and 63 and a rotor 65. The rotor carries a pinion 65ᵃ which meshes with rack teeth cut in a bar 66, which bar is operatively connected with the bridging member 59. The two stator windings are connected at a point 100 and this junction point is connected with one terminal 102 of generator G through a wire 71. The remaining ends of the two motor windings are joined by an impedance 64 which as here shown is a reactance. Point 70 between the reactance and winding 62 is connected with a "power bus-bar" and thence to the other terminal 101 of the generator G through wire 69, contacts 59 and wire 68, while point 73 is connected with an "indication bus-bar" and thence, as will later be shown, with one or the other of the control wires. With this arrangement of the windings, if current from terminal 101 reaches the motor 61 at point 70 the reactance 64 will be in series with winding 63 and the motor will have torque in such direction as to tend to hold the contacts 59 closed; but in case of a cross between wires, as pointed out hereinafter in explaining how the apparatus is protected against false operation by crosses, current from terminal 101 might reach the motor 61 at point 73, that is, between winding 63 and reactance 64, and in such case the reactance 64 will be in series with winding 62 and the motor will have torque in such direction as to tend to assist spring 60 to hold contacts 59 open. The contact 59 is first closed by hand, and is then held closed by the motor 61 which is normally energized from the generator G through the following circuit—from terminal 101 through wire 68, contacts 59, wire 69, power bus-bar, impedance 67, to point 70, thence through windings 62 and 63 in multiple, reactance 64 being in series with winding 63, then through wires 71 and 72 to generator G. The two windings 62 and 63 are thus supplied with currents of the proper phase relation to energize the motor to hold the contacts 59 closed against the action of spring 60.

I have in the drawing shown a "power bus-bar" and an "indication bus-bar". These two bus-bars extend through a portion of the interlocking machine, and they may serve for a plurality of levers like lever D. In the case of a small machine having comparatively few levers these two bus-bars may serve for the entire machine. Only one circuit breaker K is required for each pair of bus-bars. Only one generator G is required for each pair of bus-bars, and one generator may, if desired, be employed for any number of pairs of bus-bars, that is, for an entire interlocking machine.

The operation of the apparatus shown in Fig. 1 is as follows: In the drawing the parts of the apparatus are shown in the positions corresponding to what I shall herein term the "normal" position of the switch A. When it is desired to reverse the switch, the manual lever D is moved in the direction indicated by the arrow until stopped by the engagement of dog 57ᵃ with latch 56. Contact blocks 48 and 48ᵃ then engage with contacts 43 and 40 respectively. Magnet 33 is then energized by a circuit from generator G through wire 68, contacts 59, wire 69, power bus-bar, wire 74, motor winding 51, wire 75, contact 43—48, wire 76, contact R, wire 77, contact 25, wire 78, magnet 33, wires 79 and 72 to terminal 102 of generator G. Magnet 33 swings contact operating member 23 in the direction indicated by the arrow, thereby closing a circuit through the two windings of switch motor B as follows—from wire 76 through wire 80, contact 27, wire 81, winding F', wire 82, contact 29, wire 83, contact R³, wires 84 and 92, winding F, wires 85, 79 and 72 to generator G. The conductor connecting brushes P' is open at both contact R² and contact 28, but brushes P are short-circuited and are located at an angle to the resultant magnetic field produced by the two motor windings, so the motor B operates as a repulsion motor and moves the switch. Immediately after the movement begins, rocker arm 22 is actuated to reverse the position of its contacts, but this has no effect upon the circuits just traced. When the movement of the switch has been completed and the switch has been locked by the longitudinal end portion of cam slot 15, rocker arm 21 is actuated to reverse the position of contacts R, R', R² and R³. The reversal of contact R³ cuts winding F out of the motor circuit and causes the motor operating current to flow from wire 83 through contact R³, impedance 86, wires 87, 79 and 72 to generator G. The reversal of contact R² short-circuits brushes P', the circuit being from right hand brush P' through wire 91, contact 28, wire 88, contact R², wires 89 and 90 to left-hand brush P'. The motor B is disconnected from the switch by clutch M because block 12 has engaged finger 17ᵃ and thereby moved rod 17 to the left, and since the motor is already rotating, it continues to rotate being now operated as a single phase induction motor on current supplied to winding F'. This operation causes the generation in winding F of a current whose E. M. F. is substantially in quadrature to the E. M. F. supplied to winding F'. Current then flows from the lower end of winding F through wire 92, contact R', wire 93, contact 30, wire 94, contact S, wire 95, contact 48ᵃ—40, wire 96, winding 52 of indication motor 50, indication bus-bar, wire 97, point 73, through windings 62 and 63 in multiple with reactance 64 in series with winding 62, wires 71, 72, 79 and 85 to winding F. The current from generator G in winding 51 and the current from winding F in winding 52 of the indication motor 50 coact to operate this motor in such direction as to cause it to raise the latch 56, and the movement of lever D may now be completed to the position indicated in dash lines. The combined effect on the circuit breaker motor 61 of the indication current supplied at point 73 and of the power current supplied at point 70 is such as to cause the contacts 59 to remain closed, because the E. M. F. generated in winding F is substantially in quadrature with the E. M. F. of source G, and the relative direction is such that the resultant currents in windings 62 and 63 then differ in phase in the same direction as the currents which reach these windings from generator G through the point 70. When the contact R was opened at the completion of the movement of the switch, the energizing circuit for magnet 33 was opened, but contact member 23 is held by the dash pot 37 long enough to permit the indication motor 50 to actuate latch 56. When the contact member 23 is released by the dash pot and returns to its middle position, motor winding F' is disconnected from the source of current by contacts 27 and 29 and the motor B comes to rest. A movement of the switch A in the opposite direction would be accomplished in a manner similar to that just explained. Lever D would be moved back toward the position shown in solid lines until stopped by dog 57, thereby energizing magnet 34 and oscillating the member 23 in the direction opposite to that indicated by the arrow. Motor B would then be energized to rotate in such direction as to move the switch back to its normal position, and upon the completion of the movement winding F would again generate current for the control of the indication motor 50.

The system is protected against false operation by crossed wires (that is, by falsely connected wires) in the following manner: With the parts in the position shown in the drawing, wire 76 is the next control wire, that is, it is the wire to which terminal 101 of generator G will be connected to cause switch A to be reversed, the current returning to the other terminal of generator G through the common return wire 72. This wire 76 might by accident receive current from terminal 101; this might occur, for example, by a cross between wires 76 and 95, in which case cross current would flow from terminal 101 through wire 68, contact 59, wire 69, power bus-bar, wire 74, winding 51, contact 48$^a$, wire 95 to the point of false contact with wire 76, then through wire 76, contact 48, wire 96, winding 52, indication bus-bar, wire 97, then from point 73 through motor windings 62 and 63 in multiple, reactance 64 being in series with winding 62. The torque produced on motor 61 by this current will be opposite to that produced by the current supplied from generator G at the point 70, but since this latter current must pass through the impedance 67 its effect on the motor will be reduced and the effect of the cross-current will predominate so that the motor will be operated by the cross current to open contacts 59. This will open the circuits of magnets 33 and 34, and the switch motor B will therefore not be operated. When the cross is removed, contacts 59 can be again closed by hand and the system is again ready for proper operation. It is, of course, essential that the value of impedance 67 should be greater than the value of the impedance of motor winding 52. If a wire should be disconnected and the switch moved by hand to the reverse position from that shown in the drawing and the wire again connected, current would flow from generator G through contact 48$^a$, wire 95, contact S, wire 94, contact 31, magnet 34, wires 99 and 72 to generator G. The energization of magnet 34 will oscillate contact member 23 in the direction opposite to that indicated by the arrow, and the switch will therefore be moved back to the position shown in the drawings.

Referring now to Fig. 2, the apparatus here shown is similar to that shown in Fig. 1, with the following exceptions: Winding F' of switch motor B comprises three sections, $f$, $f'$ and $f^2$. When the motor is operating as a repulsion motor, section $f$ only is energized, this section, coöperating with winding F, being sufficient to produce the necessary torque; when, however, the motor is operating as a single phase induction motor on winding F' only, section $f$ and one or the other of the remaining sections of this winding are energized. This arrangement of winding F' is desirable because it permits the use of a small motor in an economical manner.

In Fig. 2, the supply of current to switch motor B is controlled by two relays N and N$^a$ which are in turn controlled by the manually operable circuit controller D. This latter circuit controller is the same as that shown in Fig. 1 except that in Fig. 2 I show a low-resistance shunt around winding 52 of indication motor 50, which shunt is opened and closed by a contact device comprising a block 58 operated by bar 47 and coöperating with two fixed contacts 58$^a$ and 58$^b$, which contact device operates in such manner that the shunt is closed when the bar 47 occupies either extreme position of its stroke, and open at all other times. The purpose of this shunt will appear hereinafter.

In Fig. 2 I have shown the switch A in the "normal" position, and the remainder of the apparatus in the positions corresponding to this position of the switch. When it is desired to move the switch to the reverse position, the manual lever D is moved in the direction indicated by the arrow until stopped by the engagement of dog 57$^a$ with latch 56. This movement causes contact block 48$^a$ to engage with fixed contact 40 and contact block 48 to engage with fixed contact 43. The winding of relay N is then energized by the following circuit: from terminal 101 of generator G through wire 68, contact 59$^a$—59—59$^b$, wire 69, power bus bar, wire 74, winding 51, wire 75 contact 43—48, wires 76 and 103, contact R$^2$, wire 104, entire winding 49 of relay N, wire 105, contact 27$^a$ of relay N$^a$, wires 106 and 72 to terminal 102 of generator G. This causes relay N to close, thereby energizing windings F and $f$ of motor B through a circuit which is the same as that just traced as far as and including wire 76, then through wire 107, contact 28, wire 108, sections $f$ of winding F', wire 109, back point of contact 28$^a$, wires 110 and 111, contact R', wires 112 and 113, winding F, wires 114 and 72 to generator G. At this time brushes P', P' are connected by the reactance 118 so that the motor then operates as repulsion motor and moves the switch A. During the early part of the movement rocker arm 22 is reversed by cam 20, but this causes no change in the circuits. When the movement of the switch is completed clutch M is disengaged by finger 17$^a$ and rocker 21 is reversed by cam 19, thereby reversing contacts R, R', and R$^2$. The reversal of contact R' disconnects motor winding F from the generator G and the reversal of contact R$^2$ opens the original circuit for winding 49 of relay N. A new circuit is now closed, including a portion of relay winding 49, and sections $f$ and $f'$ of motor winding F', this circuit being the same as the previously traced circuits up to and including wire 76, then through wire 107 front point of contact 28, wire 108, section $f$ of winding F', wire 109, back point of contact 28$^a$, wires 110 and 115, winding section $f'$, wire 116, contact R', wire 117, lower section of relay winding 49, wire 105, contact 27$^a$, wires 106 and 72 to the generator G. This current flowing through the lower section of relay 49 is sufficient to hold this relay in the closed position. The reversal of contact R closes a shunt around reactance 118 of motor B, which shunt is from wire 119 through wires 120 and 121, contact 29, wire 122, contact R, wires 123, and 124, to wire 125. The switch motor B now operates as a single-phase induction motor on the current supplied to winding sections $f$ and $f'$, and it generates an alternating current in winding F, which current is employed to energize winding 52 of indication motor 50, the circuit being from winding F through wires 113 and 126, contact R$^2$, wire 127, contact 26, wire 128, upper section of relay winding 49$^a$, wire 129, contact S$^2$, wires 130 and 95, contact 48$^a$—40, wires 96 and 133, motor winding 52, wire 131, indication bus bar, wire 97, windings 62 and 63, wires 71, 72 and 114 to motor winding F. Indication motor 50 is now energized and raises latch 56 out of the path of dog 57$^a$, so that the movement of lever D can be completed. It will be seen that this indication current passes through the upper portion of winding 49$^a$ of relay N$^a$; owing, however, to the reactance of this winding and of motor winding 52, the current is insufficient to cause relay N$^a$ to close. When, however, the movement of lever D has been completed, motor winding 52 is shunted by contact 58$^b$—58, and wire 132, so that the current in the indication circuit then becomes sufficient to close relay N$^a$. This opens the back point of contact 27$^a$, thereby deënergizing relay N and motor winding F'. The motor then stops and both relays N and N$^a$ open so that no current is consumed by any of the parts of the apparatus except the safety circuit controller K.

The operation of circuit breaker K is the same as described hereinbefore in connection with Fig. 1, so that no further explanation of this device is required.

A movement of the switch A in the opposite direction would be accomplished in a manner similar to that just explained; that is, lever D would be moved back toward the position shown in solid lines, thereby energizing relay N$^a$ and supplying current to motor windings F and F', the direction of current in the latter winding being reversed so that the motor B operates in the opposite direction to return the switch to normal position. Upon the completion of this movement winding F would again be disconnected from the generator and the current generated in this winding would be employed to control indication motor 50.

Although I have herein shown and described only two forms of apparatus and circuits embodying my invention, it is understood that various changes and modifications may be made therein within the scope of the appended claims without departing from the spirit and scope of my invention.

Having thus described my invention, what I claim is:

1. In combination, a railway traffic controlling device, an electric motor operatively connected therewith and having two field windings, a source of alternating current, means for connecting both field windings of the motor with the said source for the operation of the said traffic-controlling device, an indication device, and means for disconnecting one of the motor field windings from the said source and for connecting the latter winding with the indication device for the control of said device while the motor continues to operate on current supplied to the other field winding from the said source.

2. In combination, a railway traffic controlling device, a repulsion motor operatively connected therewith and comprising two field windings, a source of alternating current, a controlling lever, means controlled thereby for connecting the said source with said motor field windings, an indication device for the control of the lever, and means operated by the traffic controlling device upon the completion of a movement thereof for disconnecting one field winding of the motor from the source of current and connecting that winding with the indication device for the control of said device while the motor continues to operate on current supplied to the other field winding from the said source.

3. In combination, a railway traffic controlling device, an alternating current motor operatively connected therewith and comprising two field windings, a source of single phase alternating current, means for connecting both field windings of the motor with said source for the operation of the traffic controlling device, an indication device comprising a two phase motor, means for disconnecting said source of current from one of the windings of the first-mentioned motor and connecting said winding with one winding of the indication motor for the control of said indication motor by current generated in the said winding of the first-mentioned motor while the latter operates on current supplied to the other field winding from the said source, and means for supplying current to the other winding of the indication motor from the said source.

4. In combination, a railway traffic controlling device, a repulsion motor operatively connected therewith, said motor comprising two field windings located substantially ninety electrical degrees apart and two pairs of brushes located substantially ninety electrical degrees apart one of which pairs is permanently short-circuited and is located at an angle to the resultant magnetic flux produced by the two windings, a source of single phase current, means for connecting both of the said motor windings with the said source for the operation of the traffic controlling device, an indication device, and means operated by the traffic controlling device for short-circuiting the other pair of brushes and for disconnecting one of the said motor windings from the said source and connecting the latter winding with the indication device for the control of the indication device by current generated in that winding while the motor then operates as a single phase induction motor on current supplied to its other field winding from the said source.

5. In combination, a railway traffic controlling device, a repulsion motor operatively connected therewith, said motor comprising two field windings and two pairs of brushes one of which pairs is permanently short-circuited, a source of single phase current, means for connecting both of the said motor windings with the said source for the operation of the traffic controlling device, an indication device, and means operated by the traffic controlling device for short-circuiting the other pair of brushes and for disconnecting one of the said motor windings from the said source and connecting that winding with the indication device for the control of the indication device by current generated in that winding while the motor then operates as single phase induction motor on current supplied to its other field winding from the said source.

6. In combination, a railway traffic controlling device, a repulsion motor operatively connected therewith and having two field windings, a source of alternating current for the motor, means for connecting both of said windings with the source of current for the operation of the traffic controlling device, whereby the motor operates as a repulsion motor, an indication device, and means operated by the traffic controlling device for disconnecting one of the said motor windings from the source and connecting that winding with the said indication device for the control thereof while the motor operates as an induction motor on current supplied to the other field winding from the said source.

7. In combination, a railway traffic controlling device, means for moving said device comprising an electric motor having two windings, a source of alternating current, a relay adapted when energized to connect both motor windings with said source for operation of the traffic controlling device, means for controlling said relay, an indication device, means controlled by said moving means and operated upon the completion of a movement thereof to disconnect one of the motor windings from the source and connect the latter winding with the indication device for controlling the latter while the motor continues to operate on the other winding, said last-mentioned means operating also to open the first circuit of the relay winding and to connect a portion of the latter with the motor winding which is still connected with the source whereby the relay continues to be energized, and means controlled by the indication current which is generated by the motor winding not connected with the source for opening the last-mentioned circuit including the portion of the relay winding.

8. In combination, a railway traffic controlling device, means for moving said device comprising an electric motor having two windings, a source of alternating current, two relays, a control lever for connecting one relay or the other with said source, an indication device for governing movements of said lever and comprising a winding, conductors controlled by each relay when energized for connecting both motor windings with said source, one of said windings being connected in one direction or the other according to which relay is energized, whereby the traffic controlling device is moved in one direction or the other, said conductors comprising a front contact of the relay which is energized and a back contact of the relay which is not energized, means controlled by said moving means and operated upon the completion of a movement thereof to disconnect one of the motor windings from said source and connect the latter winding with the winding of the indication device for the control thereof while the motor continues to operate on current supplied from said source to the other winding, said last-mentioned means also operating to open the original circuit of the relay which is energized from the source and to include a portion of the winding of said relay in circuit with the motor winding which is still energized from the source, the circuit for the indication device winding and the motor winding connected therewith including a portion of the winding of the relay not energized from the source, and the impedance of said indication circuit being such that the current therein is not sufficient to close said last-mentioned relay, and means controlled by said lever upon the completion of the movement thereof for reducing the impedance of said circuit whereby the last-mentioned relay then closes thereby opening the motor circuit and the circuit for the other relay so that the motor then stops and both relays open.

9. In combination, a railway traffic controlling device, means for moving said device comprising a repulsion motor having two field windings, a source of alternating current, means for connecting one of said windings and a portion of the other winding with said source for operation of the motor to move the traffic controlling device, an indication device, and means operated by said moving means for disconnecting the first-mentioned winding from the source and connecting said winding with the indication device, and for connecting a larger portion of the second-mentioned winding with the source, whereby the motor continues to operate on current supplied to the latter winding and the indication device is controlled by current generated in the other winding.

In testimony whereof I affix my signature in presence of two witnesses.

JOHN S. HOLLIDAY.

Witnesses:
  A. HERMAN WEGNER,
  R. L. KISTLER.

Copies of this patent may be obtained for five cents each, by addressing the "Commissioner of Patents, Washington, D. C."